Aug. 14, 1951    A. I. BEAN    2,563,910
APPARATUS FOR MEASURING HELIX ANGLE AND TAPER
OF GEAR TEETH AND THE LIKE
Filed Dec. 7, 1948    2 Sheets-Sheet 1
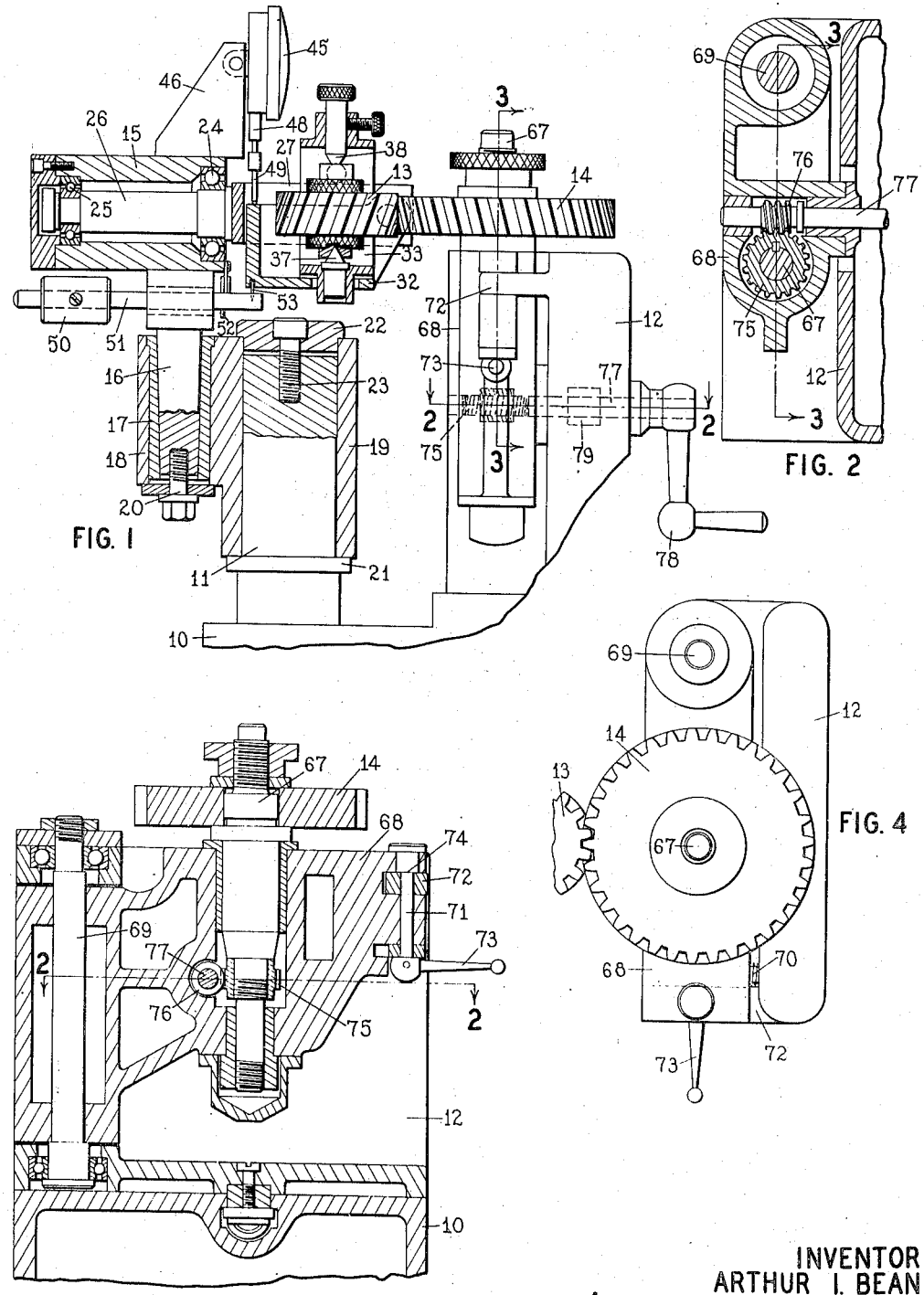
INVENTOR
ARTHUR I. BEAN
ATTYS INVENTOR
ARTHUR I. BEAN
by Wright, Brown, Quinby
  & May
ATTYS Patented Aug. 14, 1951

2,563,910

UNITED STATES PATENT OFFICE 2,563,910

APPARATUS FOR MEASURING HELIX ANGLE AND TAPER OF GEAR TEETH AND THE LIKE

Arthur I. Bean, Springfield, Vt., assignor to The Fellows Gear Shaper Company, Springfield, Vt., a corporation of Vermont Application December 7, 1948, Serial No. 63,984

8 Claims. (Cl. 33—179.5)

This invention relates to apparatus for testing, measuring, and detecting errors of, the teeth of gears and similar articles, such as gear shaper cutters, gear shaving tools, etc. For the purpose of this description, the terms "gear" and "gear teeth" shall be construed as generically including gears and gear teeth, specifically so called, and all articles which have teeth similar to gear teeth, whether designed for the transmission of power or for cutting, burnishing, or other purposes to which such similar manufactures are put.

The particular objects of the invention are to test and measure the helix angles of helical teeth and any departures which such teeth may exhibit from a prescribed standard; to test teeth of spur gear character for departures from parallelism with the axis of the toothed member, and measure the extent of such departure; and to test any of such teeth for taper, or lack of parallelism between opposite sides of a tooth, and measure the degree of taper. These objects are accomplished by the employment of a master gear and means for holding such a master gear and a test gear in mesh, with provisions for tilting movement of one of such gears about two axes transverse to each other and to the axes of the gears, and means for measuring the extent of such tilting movement about either axis.

The invention consists in apparatus embodying the principles of the means set forth in the preceding sentence, in all practicable specific forms thereof. One specific illustrative embodiment of said principles is described in the following specification with reference to the accompanying drawings, in which, Fig. 1 is a sectional view and partial elevation of so much of a testing apparatus as is needed for a full and clear disclosure of the invention;

Fig. 2 is a sectional plan view, taken on line 2—2 of Figs. 1 and 3, of the means by which the test piece is supported and rotated, in the present illustrative apparatus;

Fig. 3 is a vertical section, taken on line 3—3 of Fig. 2;

Fig. 4 is a plan view of the parts of the apparatus shown in Figs. 2 and 3;

Like reference characters designate the same parts wherever they occur in all the figures.

Figure 5:
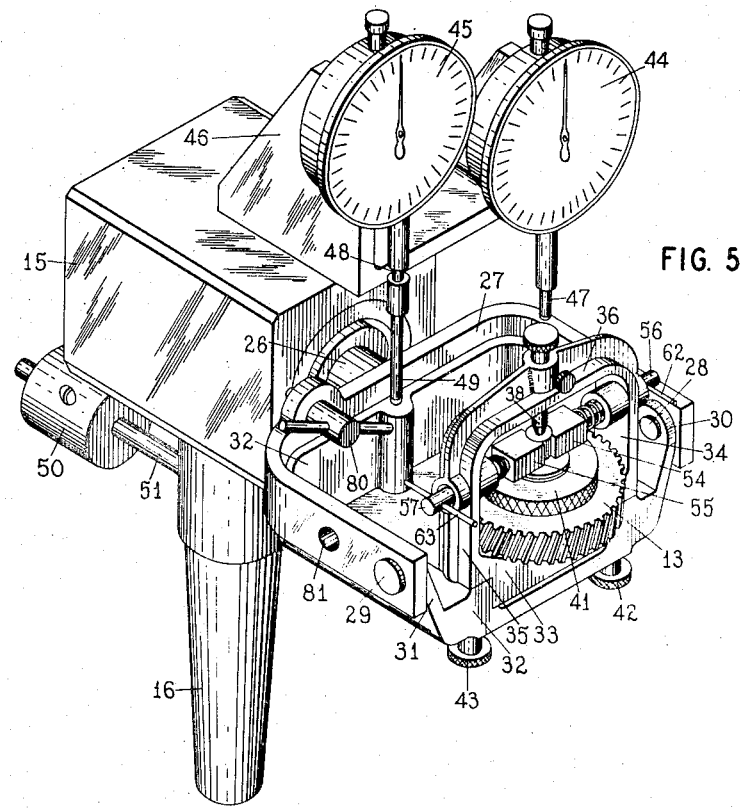
Fig. 5 is a perspective view of a subcombination of the apparatus including a master gear, means for supporting it with provisions for rotation and tilting movements, and means for measuring tilting movements about axes transverse to one another.
Figure 6:
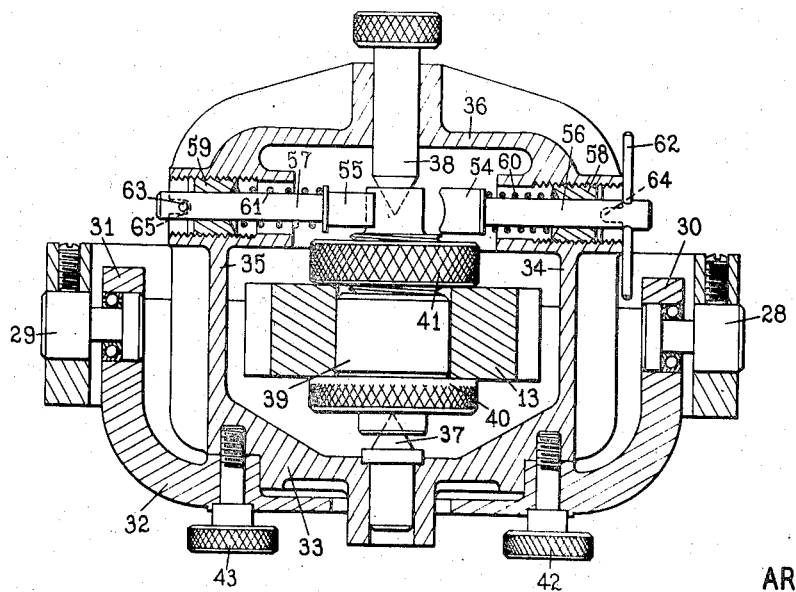
Fig. 6 is a vertical cross section of the master gear and its supporting means taken through the axis of the master gear and one of the axes of its tilting movement.

In Fig. 1 a portion of a stationary supporting base 10 is shown. A post 11 and a carriage 12 are mounted on the base, providing the foundation of supporting means for a master gear 13 and a test piece 14. The carriage 12 may be adjustable toward and away from the post 11 so as to enable test pieces of different diameters to be brought into mesh with the master gear 13, or with one or another of different master gears occupying approximately the same location as that here shown.

A subcombination unit, which I have called for convenient designation a floating head, is mounted on the post 11 and is equipped with means for holding the master gear so that it can rotate about its own axis and also tilt about two transverse axes. Such floating head comprises a body member 15 having a shank 16, which is adapted to be placed in a socket of a supporting structure of any suitable character. In the embodiment shown, such a socket is provided by a bushing 17 in an arm 18 which is part of a sleeve or hub 19 mounted on the post 11. Shank 16 and bushing 17 are complementally tapered and the shank is secured tightly and nonrotatably in the bushing by a screw 20. The hub or sleeve 19 is clamped nonrotatably between a flange 21 on the post and a cap 22 which is secured to the post by a screw 23.

Separated bearings 24 and 25 are mounted in a transverse bore in the body member 15 and support rotatably a spindle 26 which protrudes at one end from the body member and is united with a yoke or fork 27 having lateral arms parallel with the spindle 26. The arms of fork 27 carry, near their outer ends, pivots 28 and 29 in axial alinement transversely of the axis of spindle 26, on which are mounted, by means of antifriction bearings, lugs 30 and 31 forming part of a structure 32 which I call a cradle. Such cradle has three sides and a bottom extending rearwardly from the pivots 28 and 29. In the bottom of the cradle is a guideway extending parallel to the axis of spindle 26, in which is fitted slidingly a carrier 33 for the master gear 13.

Carrier 33 includes separated uprights 34, 35 and a connecting cross member 36, collectively forming a frame within which the master gear is located. Alined centers 37 and 38 are mounted in the base portion and upper cross member 36 of the carrier, and they serve to locate and hold rotatably an arbor 39, on which the master gear 13 is clamped between a flange 40 and a nut 41.

The parts last described are so arranged that the axis of pivots 28 and 29 preferably lies in a plane that is perpendicular to the axis of centers 37 and 38 and is more or less nearly midway between the end planes of master gear 13.

The carrier 33 is adjustable along its guideway in the cradle 32 through a range sufficient to enable the operating pitch circles of different master gears to be placed tangential to the axis of said pivots, which is the pivot axis of the cradle. Clamp screws 42 and 43 pass through slots in the bottom of the cradle 32 into the bottom part of the carrier 33 and serve to secure the latter at any desired point within its range of adjustment.

Two dial indicators, designated 44 and 45, respectively, are mounted on the body member 15 by means of a bracket 46. These indicators are of a commonly used type having a pointer which is geared to a linearly moving rod so as to be rotated by endwise movements of the rod with a distance-multiplying factor. The movable rod or stem 47 of indicator 44 is engaged with one of the arms of yoke 27 so as to be displaced when the yoke is rotated about the axis of its spindle 26. The rod or stem 48 of indicator 45 is engaged with the rear part of cradle 32 through a transmission rod 49 so as to cause movement of the pointer of that indicator when the cradle is tilted about the axis of pivots 28 and 29.

The center of gravity of the cradle 32, carrier 33 and master gear is at the rear of the axis of pivots 28 and 29, and the unbalanced weight of these parts is counterbalanced by a weight 50 on the long arm of a lever 51, fulcrumed on a reed 52 which depends from the forward end of the body member 15. The shorter, forwardly extending, arm of lever 51 extends under the rear part of the cradle 32 and is arranged to exert upward thrust thereon through a pin 53.

Brake shoes 54 and 55 are mounted at diametrically opposite sides of the upper end of arbor 39. These brake shoes are connected with shanks 56 and 57 which pass through guides 58 and 59 mounted in the frame uprights 34 and 35, respectively, of the master gear carrier 33. Helical springs 60 and 61 surround the stems 56 and 57 between the respective brake shoes and guides. The guides are screw threaded in the uprights of the carrier and can be adjusted so as to vary the force of the springs. Cross bars 62 and 63 are mounted crosswise in the outer ends of the shanks 56 and 57 and are adapted either to be placed across the outer ends of the threaded passageways wherein the guides 58 and 59 are located or, by rotation of the shanks, to enter notches 64 and 65 in the walls of such passageways. Thus the brake shoes may either be withdrawn clear of the arbor, as indicated with respect to the shoe 54, or be spring pressed, with regulatable pressure, against the arbor, as shown with respect to the shoe 55, according as it may be desired to allow the master gear to rotate freely or against frictional resistance.

Test pieces or work gears, one of which is shown and designated 14, are mounted singly on a spindle 67 which is rotatable in bearings in an arm 68 connected to the carriage 12 by a pivot shaft 69 which is secured to the arm and projects at its ends into anti-friction bearings on the carriage. The spindle 67 is located so that its axis is parallel to the zero position of the axis of centers 37—38 and is at the opposite side of the latter axis from the spindle 26 of yoke 27. The pivot shaft 69 is at one side of the plane which contains the axes of spindle 67 and centers 37—38 so that the arm 68 may move in a manner which permits shifting of the test gear toward and away from the axis of the centers. A spring 70 reacts between the arm 68 and carriage 12 to press the test gear into forcible mesh with the master gear.

The arm 68 may be clamped immovably in a position which provides more or less backlash between the test gear and master gear. For this purpose a clamp rod 71 is carried by the arm near its outer end passing through a slot in a lug 72 which extends from the carriage 12 through a notch in the outer end of the arm. A cam lever 73 pivoted to the lower end of rod 71 is operable to draw the rod downward so that a shoulder 74 thereon is forced against the lug 72.

For rotating the test piece and master gear, a worm gear 75 is secured to the work spindle 67 and meshes with a worm 76 on a shaft 77 which occupies bearings in the arm 68. A crank 78 on the outer end of shaft 77 serves for rotating the worm 76. Shaft 77 is made of a number of sections connected together by one or more couplings, shown conventionally at 79 in Fig. 1, constructed to permit displacement of the worm 76 with the arm 68 when the latter is moved; thereby avoiding any incremental rotation of the test piece in consequence of displacements of the arm.

It will be appreciated from the foregoing that when a test piece is brought into mesh with the master gear the yoke 27 will be tilted if the teeth of the test gear are inclined with respect to the axis of the gear at a different inclination than that of the master gear teeth, and the indicator 44 will show such tilting and measure its extent. Or, if the teeth of the test gear are tapered, the cradle 32 will be tilted about the bearings 28 and 29 and the indicator 45 will show any such tilting and measure the degree thereof. If there is both a helical deviation and a taper of the test gear teeth, both indicators will be correspondingly affected, unless either the yoke or the cradle is prevented from tilting by means later described.

It may be noted that a master gear having helical teeth of a given helix angle is used for testing helical gears of the same angle, and the indicator 44 then measures aberrations of the helix angle of the test gear teeth from the prescribed angle. A spur master gear is used for testing spur gears; and in that case, if the teeth of the test gear are other than parallel with the axis of that gear, the aberration is shown and measured by the indicator 44. When testing either helical or spur gears by meshing with a helical or spur master gear, the indicator 45 shows if the test gear teeth are tapered.

By rotating the crank 78 when the gears are in mesh, all of the teeth are tested in succession.

If it is desired to test for taper alone, the fork 27 is prevented from tilting by a taper pin 80 which is inserted through a hole in the rear part of the fork into a tapered hole in the body member 15. Or, if it is desired to test for helical aberrations only, a taper pin similar to the pin 80 is passed through a hole 81 in one of the arms of the fork into a complemental hole in the adjacent side portion of the cradle 33, the pin 80 being then removed. When both pins are removed, helical aberrations and taper are indicated simultaneously.

To obtain the best results in respect to accuracy, the axes of the spindle 26 and of the pivots 28 and 29 should intersect at right angles, and their plane should be perpendicular to the axis of the centers 37 and 38 and approximately midway between the end planes of the master gear. Preferably also the point of engagement of the indicator stem 47 with the yoke 27 should be in the same plane, as by insertion into a socket in the yoke arm with which it makes contact. While some departure from these conditions would permit satisfactory measurements, any large departures would either cause inaccuracy or require calibration. The extension rod 49 of the stem of indicator 45 should make contact with the rear part of cradle 32 at a point in, or close to, the extended axis of spindle 26, in order that tilting of yoke 27 shall not cause any movement of the pointer of this indicator.

It is sometimes necessary to test and measure the taper or helix angle error of one side only of the test piece teeth. For making such measurements, the arm 68 is fixed, by means of the clamping arm 73, in a position where there is enough backlash so that meshing teeth of the master and test gears can make contact on one side only, and the brake shoes 54 and 55 are applied to the master gear arbor so as to afford sufficient resistance to the rotation of the master gear. To be sufficient, the braking resistance must be greater than that of the yoke and cradle to rotation about their respective axes.

When the arm is not thus clamped fast, the spring 70 takes up all backlash and causes the intermeshing teeth of master gear and test piece to make contact on both side faces, and allows the arm to move in and out if the teeth of the test piece are eccentric or irregular as to thickness and spacing.

A record of the errors indicated by the means here described may be made by a pen and chart mechanism in combination with, or substitution for, the indicators 44 and 45. Known mechanical and electrical means are available for this purpose as, for instance, that of the Leonard Patent 2,305,264, December 15, 1942.

Although the foregoing description states that the master gear is mounted on the floating head and the test piece is mounted on another supporting member, it should be understood that the positions of these gears may be reversed in any situation where the test piece is of such character that it may be effectively mounted on the carrier of the floating head; and that carriers equivalent to the one here shown may be variously designed to accommodate a wide variety of gears and the like, within the definition of the term "gear" as given in the introductory part of this specification.

I claim:

1. In an apparatus for the purpose set forth, means for supporting a gear or similar toothed article, comprising a body member, a yoke having a spindle rotatably mounted in said body member and separated arms, a cradle pivotally connected with the arms of said yoke to turn about an axis transverse to the axis of said spindle, a carrier mounted on said cradle having means for rotatably supporting a gear or gear-like article with its axis transverse to the two precedently named axes, and means for indicating and measuring angular movements of the yoke and cradle about their respective axes.

2. In an apparatus for the purpose set forth, means for supporting a gear or similar toothed article, comprising a body member, a yoke having a spindle rotatably mounted in said body member and separated arms, a cradle pivotally connected with the arms of said yoke to turn about an axis transverse to the axis of said spindle, a carrier mounted on said cradle having means for rotatably supporting a gear or gear-like article with its axis transverse to the two precedently named axes, and indicating instruments mounted on said body member, said instruments being engaged with the yoke and cradle, respectively, to show and measure angular movements of the yoke and cradle about their respective axes.

3. In an apparatus for the purpose set forth, means for supporting a gear or similar toothed article, comprising a body member, a yoke having a spindle rotatably mounted in said body member and separated arms, a cradle pivotally connected with the arms of said yoke to turn about an axis transverse to the axis of said spindle, a carrier mounted on said cradle having means for rotatably supporting a gear or gear-like article with its axis transverse to the two precedently named axes, a releasable lock interengageable between the yoke and body member for preventing angular movement of the yoke, and indicating means arranged to show angular movement of the carrier relative to the yoke.

4. In an apparatus for the purpose set forth, means for supporting a gear or similar toothed article, comprising a body member, a yoke having a spindle rotatably mounted in said body member and separated arms, a cradle pivotally connected with the arms of said yoke to turn about an axis transverse to the axis of said spindle, a carrier mounted on said cradle having means for rotatably supporting a gear or gear-like article with its axis transverse to the two precedently named axes, means interengageable between the yoke and cradle for preventing angular movement of the cradle relative to the yoke, and indicating means arranged to show angular movement of the yoke relative to the body member.

5. Apparatus for testing gear teeth and the like, comprising a supporting structure, a body member mounted on said supporting structure, a yoke having a spindle rotatably mounted in said body, a cradle pivoted to the arms of said yoke on an axis transverse to the axis of the spindle, means for mounting a gear or similar article on said cradle to rotate about an axis transverse to both of the before named axes, a carriage mounted on the supporting structure having means for mounting rotatably a gear or similar article in mesh with the first named gear or similar article, and indicators mounted on said body member in engagement with both said yoke and cradle arranged to show the angular movements of each around its respective axis.

6. Apparatus for testing gear teeth and the like, comprising a supporting structure, a body member mounted on said supporting structure, a yoke having a spindle rotatably mounted in said body, a cradle pivoted to the arms of said yoke on an axis transverse to the axis of the spindle, a carrier mounted on said cradle with provisions for linear movement in the direction of the spindle axis, pivotal means for rotatably mounting a gear or similar article on said carrier with its axis transverse to both the before named axes, a holder mounted on the supporting structure having means for holding rotatably a gear or similar article and being adjustable to place the gear or similar article which it supports in mesh with the first named gear or similar article; said carrier and support being relatively disposed to locate the pitch circles of the meshing gears or similar articles substantially tangent to the axis of the cradle, and indicators engaged with the yoke and cradle respectively disposed to show the character and amount of angular movements of both about their respective axes.

7. In a testing apparatus of the character described, a body member, a yoke having separated arms and a spindle rotatably mounted in said body member, a cradle pivoted to said arms on an axis transverse to and intersecting the spindle axis, a gear or similar article and an arbor in rigid association therewith mounted on said cradle to rotate about an axis perpendicular to the other two axes, braking means in frictional, rotation resisting, engagement with said arbor, and indicators mounted on said body member in engagement with the yoke and cradle respectively arranged to show and measure angular movements of the yoke and cradle about their respective axes.

8. In a testing apparatus, a body member, a yoke having separated arms and a spindle rotatably mounted on a horizontal axis in said body member, a cradle pivoted to the arms of said yoke on a horizontal axis intersecting transversely the axis of said spindle, a carrier mounted on said cradle adjustably for movement in a direction parallel to the spindle axis, pivotal means on the carrier arranged to support rotatably a gear or similar article with its mid length approximately in the plane of the before named axes, the center of gravity of the cardle and the parts supported thereby being at one side of the axis of the cradle, and a counterbalance in reacting connection with the body member and engaged with the cradle at a point at one side of the pivot axis thereof.

ARTHUR I. BEAN.

REFERENCES CITED

The following references are of record in the file of this patent:

UNITED STATES PATENTS

| Number | Name | Date |
|---|---|---|
| 1,445,631 | Lotz | Feb. 20, 1923 |
| 2,348,712 | Dahlerup | May 16, 1944 |
| 2,367,004 | Chitwood | Jan. 9, 1945 |
| 2,447,445 | Widen | Aug. 17, 1948 |

FOREIGN PATENTS

| Number | Country | Date |
|---|---|---|
| 460,008 | Great Britain | Jan. 19, 1937 |